(12) United States Patent
Chen (10) Patent No.: US 12,541,082 B2
(45) Date of Patent: Feb. 3, 2026

(54) OPTICAL LENS AND ELECTRONIC APPARATUS

(71) Applicant: ABILITY ENTERPRISE CO., LTD., New Taipei (TW)

(72) Inventor: Jung-Yao Chen, New Taipei (TW)

(73) Assignee: ABILITY ENTERPRISE CO., LTD., New Taipei (TW)

(*) Notice: Subject to any disclaimer, the term of this patent is extended or adjusted under 35 U.S.C. 154(b) by 415 days.

(21) Appl. No.: 17/331,960

(22) Filed: May 27, 2021

(65) Prior Publication Data

US 2021/0373301 A1    Dec. 2, 2021

(30) Foreign Application Priority Data

Jun. 2, 2020    (TW) ................................ 109118441

(51) Int. Cl.
*G02B 15/14* (2006.01)
*G02B 7/09* (2021.01)
*G02B 13/00* (2006.01)

(52) U.S. Cl.
CPC .......... *G02B 15/1441* (2019.08); *G02B 7/09* (2013.01); *G02B 13/0045* (2013.01)

(58) Field of Classification Search
CPC .. G02B 15/1441; G02B 7/09; G02B 13/0045; G02B 15/144109; G02B 15/144105; G02B 15/144111; G02B 13/12; G02B 15/145111; G02B 15/145127; G02B 13/102

USPC .............. 359/767, 681, 683, 715, 729, 682, 359/686–688, 747, 753, 771–783, 359/771–783
See application file for complete search history.

(56) References Cited

U.S. PATENT DOCUMENTS

| 5,101,299 | A  | * | 3/1992  | Iwasaki ........... G02B 15/144111 359/683 |
| 2007/0223103 | A1 | * | 9/2007  | Yamamoto ......... G02B 15/1465 359/683 |
| 2011/0122506 | A1 | * | 5/2011  | Ito ........................ G02B 27/646 359/683 |
| 2013/0070123 | A1 | * | 3/2013  | Imaoka .......... G02B 15/145523 359/683 |
| 2016/0004038 | A1 | * | 1/2016  | Huang ................... G02B 13/18 359/713 |
| 2018/0180856 | A1 | * | 6/2018  | Jung .................. G02B 13/0045 |
| 2018/0348476 | A1 | * | 12/2018 | Machida .............. G02B 15/142 |

OTHER PUBLICATIONS

Taiwan Office Action issued by the TIPO on Jun. 28, 2024 for application No. 109118441, 5 pages.

* cited by examiner

*Primary Examiner* — Marin Pichler
*Assistant Examiner* — Kuei-Jen L Edenfield
(74) *Attorney, Agent, or Firm* — Innovation Counsel LLP (57) ABSTRACT

An optical lens, in order from an object side to an image-forming side, includes: a first lens having positive refractive power, a second lens having negative refractive power, a third lens having positive refractive power, a fourth lens having positive refractive power, a fifth lens having negative refractive power, a sixth lens having negative refractive power, a seventh lens having negative refractive power and an eighth lens having refractive power.

8 Claims, 7 Drawing Sheets

| Lens | Surface number | Curvature radius (mm) | Thickness (mm) | Refractive index | Abbe number | Effective diameter (mm) | Focal length (mm) |
|---|---|---|---|---|---|---|---|
| L1 | S1 | 25.7 | 3.79 | 1.8 | 51 | 23.2 | 94 |
| | S2 | 37.7 | 8.05 | | | 21.8 | |
| | STO | ∞ | 0.10 | | | 14.1 | |
| L2 | S3 | 132.5 | 1.00 | 2.0 | 25 | 14.1 | -19 |
| | S4 | 16.7 | 0.10 | | | 13.9 | |
| L3 | S5 | 14.5 | 4.37 | 1.5 | 82 | 14.3 | 25 |
| | S6 | -83.2 | 1.90 | | | 14.6 | |
| L4 | S7 | 19.1 | 3.85 | 2.0 | 25 | 14.8 | 12 |
| | S8 | -29.8 | 0.22 | | | 14.2 | |
| L5 | S9 | -25.0 | 0.90 | 1.9 | 31 | 14.1 | -13.6 |
| | S10 | 24.9 | 21.51 | | | 13.0 | |
| L6 | S11 | -6.2 | 1.85 | 1.5 | 82 | 11.2 | -82 |
| | S12 | -8.0 | 24.52 | | | 12.0 | |
| L7 | S13 | -6.8 | 3.33 | 1.7 | 31 | 12.4 | -25 |
| | S14 | -13.4 | 0.10 | | | 14.6 | |
| L8 | S15 | 21.8 | 4.67 | 1.6 | 72 | 16.2 | 18 |
| | S16 | -17.1 | 3.00 | | | 17.0 | |
| F | S17 | ∞ | 0.30 | 1.5 | 64 | 8.3 | |
| | S18 | ∞ | 0.40 | | | 8.3 | |
| C | S19 | ∞ | 0.50 | 1.5 | 64 | 8.1 | |
| | S20 | ∞ | 0.53 | | | 8.1 | |
| | IMA | ∞ | 0.00 | | | 7.9 | |

FIG. 3

| Lens | Surface number | Curvature radius (mm) | Thickness (mm) | Refractive index | Abbe number | Effective diameter (mm) | Focal length (mm) |
|---|---|---|---|---|---|---|---|
| L1 | S1 | 25.7 | 3.79 | 1.8 | 51 | 23.2 | 94 |
|  | S2 | 37.7 | 25.26 |  |  | 21.8 |  |
|  | STO | ∞ | 0.10 |  |  | 14.1 |  |
| L2 | S3 | 132.5 | 1.00 | 2.0 | 25 | 14.1 | -19 |
|  | S4 | 16.7 | 0.10 |  |  | 13.9 |  |
| L3 | S5 | 14.5 | 4.37 | 1.5 | 82 | 14.3 | 25 |
|  | S6 | -83.2 | 1.90 |  |  | 14.6 |  |
| L4 | S7 | 19.1 | 3.85 | 2.0 | 25 | 14.8 | 12 |
|  | S8 | -29.8 | 0.22 |  |  | 14.2 |  |
| L5 | S9 | -25.0 | 0.90 | 1.9 | 31 | 14.1 | -13.6 |
|  | S10 | 24.9 | 4.31 |  |  | 13.0 |  |
| L6 | S11 | -6.2 | 1.85 | 1.5 | 82 | 11.2 | -82 |
|  | S12 | -8.0 | 1.90 |  |  | 12.0 |  |
| L7 | S13 | -6.8 | 3.33 | 1.7 | 31 | 12.4 | -25 |
|  | S14 | -13.4 | 0.10 |  |  | 14.6 |  |
| L8 | S15 | 21.8 | 4.67 | 1.6 | 72 | 16.2 | 18 |
|  | S16 | -17.1 | 25.63 |  |  | 17.0 |  |
| F | S17 | ∞ | 0.30 | 1.5 | 64 | 8.3 |  |
|  | S18 | ∞ | 0.40 |  |  | 8.3 |  |
| C | S19 | ∞ | 0.50 | 1.5 | 64 | 8.1 |  |
|  | S20 | ∞ | 0.53 |  |  | 8.1 |  |
|  | IMA | ∞ | 0.00 |  |  | 7.9 |  |

FIG. 4

| Surface number | S1 | S11 | S12 | S13 | S14 | S15 | S16 |
|---|---|---|---|---|---|---|---|
| K | 0 | 0 | 0 | -2.1 | 0 | -5.4 | 0 |
| A2 | 0 | 0 | 0 | 0 | 0 | 0 | 0 |
| A4 | -2.52E-07 | 0.000992113 | 0.000661138 | 0.000153442 | 0.000241514 | -0.000229598 | -1.78E-05 |
| A6 | 4.36E-09 | -1.31E-05 | -1.36E-05 | -1.32E-06 | 1.38E-06 | 3.34E-06 | -1.14E-06 |
| A8 | -4.56E-11 | 1.59E-06 | 1.19E-06 | -6.99E-08 | -5.73E-08 | -1.63E-08 | 2.94E-08 |
| A10 | 2.61E-13 | -4.50E-08 | -4.19E-08 | 4.92E-09 | 2.08E-09 | 0 | -3.45E-10 |

FIG. 5

| | OL1 |
|---|---|
| $F_w$ (mm) | 46.69 |
| $F_t$ (mm) | 93.4 |
| $F_t/F_w$ | 2 |
| $F_{G1}$ (mm) | 94 |
| $F_{G2}$ (mm) | 121.3 |
| $F_{G3}$ (mm) | -82 |
| $F_{G4}$ (mm) | 32.9 |
| $F_{G1}/F_{G2}$ | 0.775 |
| TTL (mm) | 85 |
| Fno | 2.8 |
| $FOV_t$ (°) | 4.8 |
| Y (mm) | 3.9 |
| $FOV_w$ (°) | 9.5 |
| $TTL/F_w$ | 1.82 |
| $TTL/F_t$ | 0.91 |
| $F_w/Y$ | 11.97 |
| $F_t/Y$ | 23.95 |
| R1 (mm) | 25.74 |
| R2 (mm) | 37.68 |
| R15 (mm) | 21.85 |
| R16 (mm) | -17.1 |
| (R1-R2)/(R1+R2) | -0.19 |
| (R15+R16)/(R15-R16) | 0.12 |

OPTICAL LENS AND ELECTRONIC APPARATUS

This application claims the benefit of Taiwan application Serial No. 109118441, filed Jun. 2, 2020, the subject matter of which is incorporated by reference herein in its entirety.

TECHNICAL FIELD

The invention relates in general to an optical lens and an electronic apparatus, and more particularly to an optical lens and an electronic apparatus with a thin and light weight, a high zoom magnification and a good imaging quality.

BACKGROUND

Optical lenses may be divided into the fixed-focus lens and the zoom lens, of which the zoom lens is provided with the advantage of variable focal length, making its applicability more extensive. In order to achieve high zoom magnification, low distortion and high imaging quality of the zoom lens, a number of lenses are required to be used in the zoom lens in most cases, so that it is hard to reduce the volume of the zoom lens. If the number of lenses is reduced, it is impossible to achieve the performance requirements of the zoom lens. Therefore, there is an urgent need to propose a novel optical lens which may simultaneously meet the requirements of thinness, high zoom magnification and high imaging quality.

SUMMARY

The invention is directed to an optical lens and an electronic apparatus with the characteristics of thinness, high zoom magnification, low distortion and high imaging quality.

According to one embodiment, an optical lens is provided. The optical lens, in order from an object side to an image-forming side, includes a first lens having positive refractive power, a second lens having negative refractive power, a third lens having positive refractive power, a fourth lens having positive refractive power, a fifth lens having negative refractive power, a sixth lens having negative refractive power, a seventh lens having negative refractive power and an eighth lens having refractive power.

According to another embodiment, an optical lens is provided. The optical lens, in order from an object side to an image-forming side, includes a first lens having positive refractive power, a second lens having negative refractive power, a third lens having positive refractive power, a fourth lens having positive refractive power, a fifth lens having negative refractive power, a sixth lens having negative refractive power, a seventh lens having negative refractive power and an eighth lens having refractive power. TTL is a lens length of the optical lens, TLt is a lens length of the optical lens at a telescopic end, and TLw is a lens length of the optical lens at a wide-angle end. The optical lens satisfies at least one of the following conditions: 70 mm≤TTL≤100 mm, TLt=TLw and TLt=TLw=TTL.

According to still another embodiment, an optical lens is provided. The optical lens, in order from an object side to an image-forming side, includes a first lens having positive refractive power, a second lens having negative refractive power, a third lens having positive refractive power, a fourth lens having positive refractive power, a fifth lens having negative refractive power, a sixth lens having negative refractive power, a seventh lens having negative refractive power and an eighth lens having refractive power. Ft is a focal length of the optical lens at a telescopic end, and Fw is a focal length of the optical lens at a wide-angle end. The optical lens satisfies at least one of the following conditions: 80 mm≤Ft≤120 mm, 35 mm≤Fw≤60 mm and 1.3≤Ft/Fw≤4.

According to a further embodiment, an electronic apparatus is provided. The optical apparatus includes an optical lens, a control module and a driving module. The optical lens captures a plurality of images. The control module is electrically connected to the optical lens, and calculates a focus information of the optical lens in accordance with a target in the images. The driving module is electrically connected to the control module and the optical lens, and drives the optical lens to focus in accordance with the focus information.

The above and other aspects of the invention will become better understood with regard to the following detailed description of the preferred but non-limiting embodiment(s). The following description is made with reference to the accompanying drawings.

DETAILED DESCRIPTION

Each embodiment of the present invention will be described in detail hereinafter, and illustrated with the accompanying drawings. In addition to these detailed descriptions, the present invention may be broadly practiced in other embodiments, and any substitution, modification, or equivalent variation of any of the described embodiments is included within the scope of the present invention, subject to the scope of the claims thereafter. In the description of the specification, many specific details are provided in order to give the reader a more complete understanding of the present invention; however, the present invention may be practiced with the omission of some or all of these specific details. In addition, well-known steps or elements are not described in detail to avoid unnecessary limitations of the present invention. Identical or similar elements in the drawings will be indicated by identical or similar reference numerals. In particular, the drawings are only for illustrative purposes and do not represent the actual size or number of elements, unless they are otherwise indicated.

Figure 1:
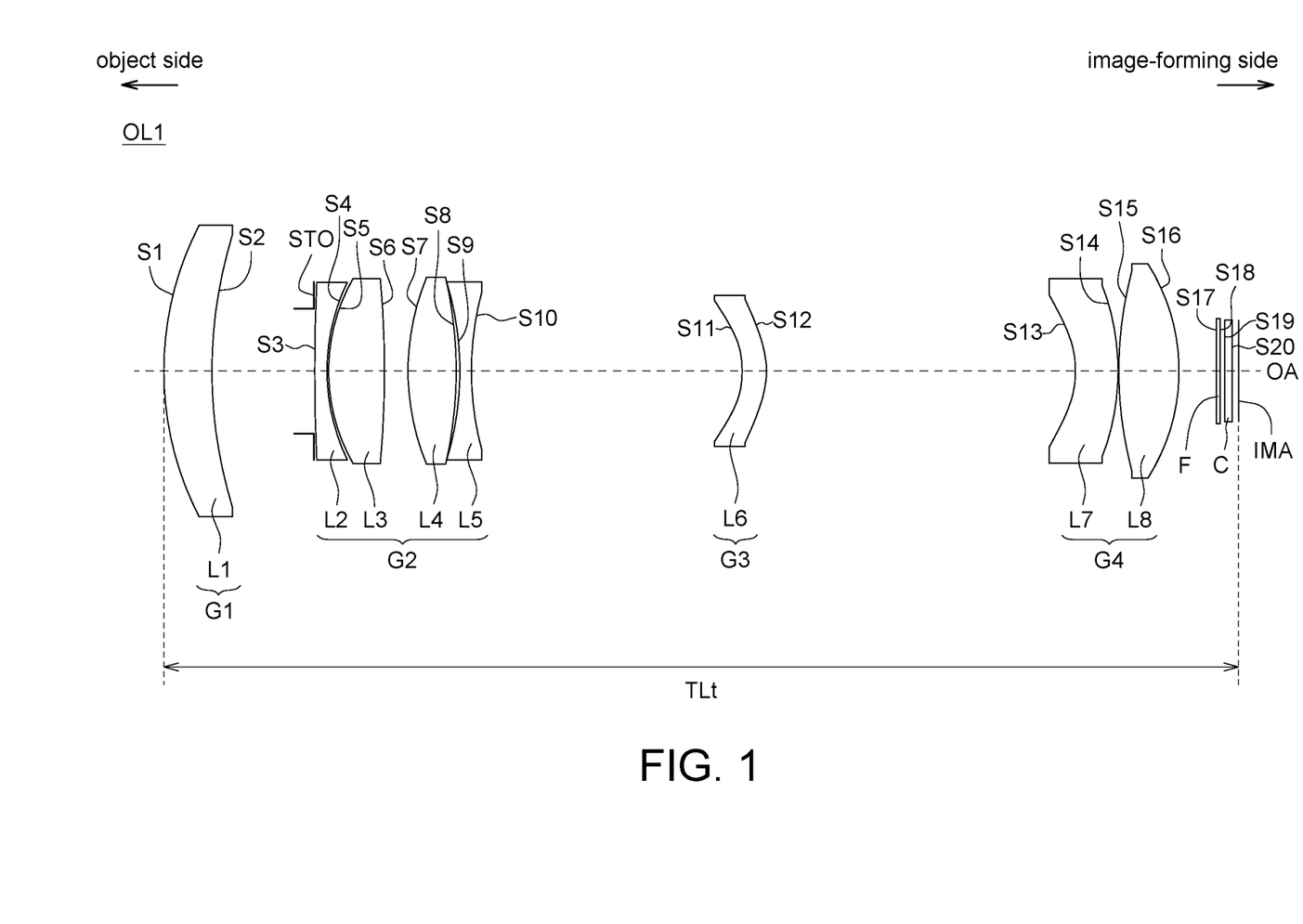
FIG. 1 is a schematic diagram illustrating the position of each lens of an optical lens when the optical lens is at a telescopic end according to one embodiment of the present invention.
Figure 2:
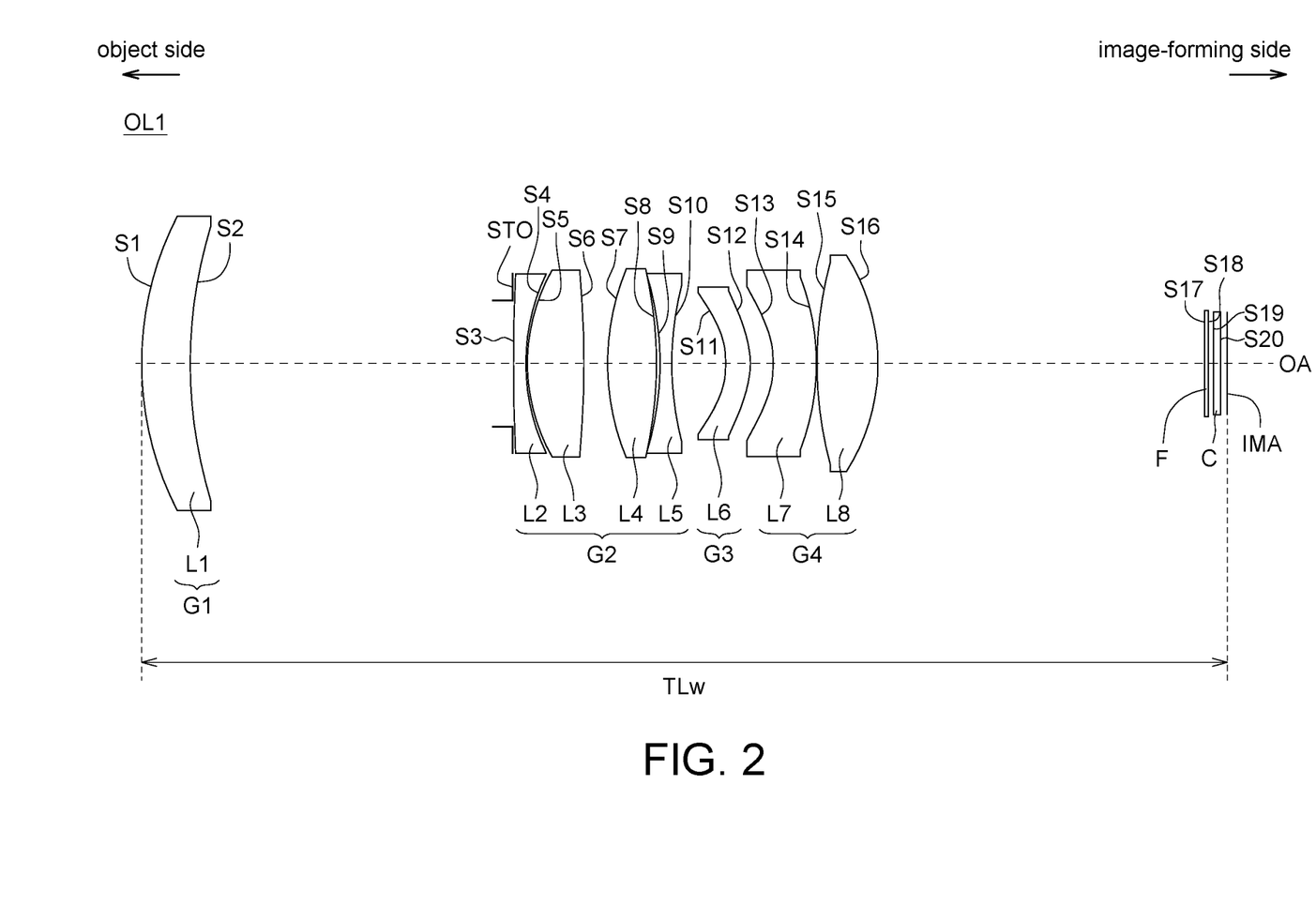
FIG. 2 is a schematic diagram illustrating the position of each lens of the optical lens when the optical lens of FIG. 1 is at a wide-angle end.

FIG. 1 is a schematic diagram illustrating the position of each lens of an optical lens OL1 when the optical lens OL1 is at a telescopic end according to one embodiment of the present invention. FIG. 2 is a schematic diagram illustrating the position of each lens of the optical lens OL1 when the optical lens OL1 of FIG. 1 is at a wide-angle end. In order to show the features of the embodiments, only the structures related to the embodiments of the present invention are shown and the rest of the structures are omitted.

The optical lens OL1 may be a zoom lens, which may be applied to a device capable of image projection or image capture, the device including but not limited to a handheld computer system, a handheld communication system, an aerial camera, a sports camera lens, a camera lens for vehicle, a surveillance system, an internet protocol camera, a digital camera, a digital video camera or a projector.

Referring to FIG. 1 and FIG. 2, the left side is the object side and the right side is the image-forming side. The light beam may penetrate each lens in the optical lens OL1 from the object side and may be imaged on an imaging plane IMA on the image-forming side. The optical lens OL1, in order from the object side to the image-forming side, may include a first lens L1, a second lens L2, a third lens L3, a fourth lens L4, a fifth lens L5, a sixth lens L6, a seventh lens L7 and an eighth lens L8. The above eight lenses may be arranged along an optical axis OA. The first lens L1, the second lens L2, the third lens L3, the fourth lens L4, the fifth lens L5, the sixth lens L6, the seventh lens L7 and the eighth lens L8 may have refractive power, respectively.

In one embodiment, the first lens L1 may have positive refractive power, the second lens L2 may have negative refractive power, the third lens L3 may have positive refractive power, the fourth lens L4 may have positive refractive power, the fifth lens L5 may have negative refractive power, the sixth lens L6 may have negative refractive power, the seventh lens L7 may have negative refractive power, and the eighth lens L8 may have refractive power. In one specific embodiment, the eighth lens L8 has positive refractive power.

In one embodiment, the lens length is defined as the distance between an object-side surface S1 of the first lens L1 and the imaging plane IMA. TTL is the lens length of the optical lens OL1. TLt is the lens length of the optical lens OL1 at the telescopic end. TLw is the lens length of the optical lens OL1 at the wide-angle end. The optical lens OL1 may satisfy the condition of TLt=TLw.

In one specific embodiment, the optical lens OL1 may satisfy the condition of TTL=TLt=TLw. That is, during the zooming process of the optical lens OL1, the lens length of the optical lens OL1 remains unchanged.

In one embodiment, the optical lens OL1 may satisfy at least one of the following conditions: 70 mm≤TTL, 75 mm≤TTL, 80 mm≤TTL, TTL≤90 mm, TTL≤95 mm and TTL≤100 mm.

In one embodiment, Ft is the focal length of the optical lens OL1 at the telescopic end. Fw is the focal length of the optical lens OL1 at the wide-angle end. The optical lens OL1 may satisfy at least one of the following conditions: 1.3≤Ft/Fw, 1.5≤Ft/Fw, 1.7≤Ft/Fw, Ft/Fw≤2.3, Ft/Fw≤3, Ft/Fw≤3.5 and Ft/Fw≤4.

In one embodiment, the focal length of the optical lens OL1 at the telescopic end may satisfy at least one of the following conditions: 80 mm≤Ft, 85 mm≤Ft, 90 mm≤Ft, Ft≤95 mm, Ft≤100 mm, Ft≤110 mm and Ft≤120 mm.

In one embodiment, the focal length of the optical lens OL1 at the wide-angle end may satisfy at least one of the following conditions: 35 mm≤Fw, 40 mm≤Fw, 45 mm≤Fw, Fw≤50 mm, Fw≤55 mm and Fw≤60 mm.

In one embodiment, the optical lens OL1 at the telescopic end may satisfy at least one of the following conditions: 0.8≤TTL/Ft, 0.85≤TTL/Ft, 0.9≤TTL/Ft, TTL/Ft≤0.95, TTL/Ft≤1, TTL/Ft≤1.1 and TTL/Ft≤1.2.

In one embodiment, the optical lens OL1 at the wide-angle end may satisfy at least one of the following conditions: 1.3≤TTL/Fw, 1.4≤TTL/Fw, 1.5≤TTL/Fw, 1.6≤TTL/Fw, 1.68≤TTL/Fw, 1.75≤TTL/Fw, 1.8≤TTL/Fw, TTL/Fw≤1.85, TTL/Fw≤1.9, TTL/Fw≤2, TTL/Fw≤2.2 and TTL/Fw≤2.5.

In one embodiment, the light beam incident to the optical lens OL1 may be converged to the imaging plane IMA. Y is the image height on the imaging plane IMA. The optical lens OL1 at the telescopic end may satisfy at least one of the following conditions: 20<Ft/Y, 21≤Ft/Y, 23≤Ft/Y, Ft/Y≤25, Ft/Y≤27 and Ft/Y<30.

In one embodiment, the optical lens OL1 at the wide-angle end may satisfy at least one of the following conditions: 8<Fw/Y, 10≤Fw/Y, Fw/Y≤13, Fw/Y≤18 and Fw/Y<20.

Furthermore, in one embodiment, the first lens L1 has a refractive index of N1 and an Abbe number of V1, the second lens L2 has a refractive index of N2 and an Abbe number of V2, the third lens L3 has a refractive index of N3 and an Abbe number of V3, the fourth lens L4 has a refractive index of N4 and an Abbe number of V4, the fifth lens L5 has a refractive index of N5 and an Abbe number of V5, the sixth lens L6 has a refractive index of N6 and an Abbe number of V6, the seventh lens L7 has a refractive index of N7 and an Abbe number of V7, and the eighth lens L8 has a refractive index of N8 and an Abbe number of V8. The optical lens OL1 may satisfy at least one of the following conditions: N2>N5, N4>N5, N5>N1, N1>N7, N7>N8, N8>N3, N8>N6, V3>V8, V6>V8, V8>V1, V1>V5, V1>V7, V7>V2 and V7>V4.

In one embodiment, R1 is a curvature radius of the object-side surface S1 of the first lens L1, and R2 is a curvature radius of an image-side surface S2 of the first lens L1. The optical lens OL1 may satisfy at least one of the following conditions: 0≤|(R1−R2)/(R1+R2)|, 0.1≤|(R1−R2)/(R1+R2)|, |(R1−R2)/(R1+R2)|≤0.25, |(R1−R2)/(R1+R2)|≤0.3, |(R1−R2)/(R1+R2)|≤0.5 and |(R1−R2)/(R1+R2)|≤1.

In one embodiment, the optical lens OL1 may satisfy at least one of the following conditions: −1≤(R1−R2)/(R1+R2), −0.5≤(R1−R2)/(R1+R2), −0.3≤(R1−R2)/(R1+R2), −0.25≤(R1−R2)/(R1+R2), (R1−R2)/(R1+R2)≤−0.1 and (R1−R2)/(R1+R2)≤0.

In one embodiment, R15 is a curvature radius of an object-side surface S15 of the eighth lens L8, and R16 is a curvature radius of an image-side surface S16 of the eighth lens L8. The optical lens OL1 may satisfy at least one of the following conditions: 0≤|(R15+R16)/(R15−R16)|, 0.05≤|(R15+R16)/(R15−R16)|, |(R15+R16)/(R15−R16)|≤0.15, |(R15+R16)/(R15−R16)|≤0.3, |(R15+R16)/(R15−R16)|≤0.5 and |(R15+R16)/(R15−R16)|≤1.

In one embodiment, the optical lens OL1 may satisfy at least one of the following conditions: 0≤(R15+R16)/(R15−R16), 0.05≤(R15+R16)/(R15−R16), (R15+R16)/(R15−R16)≤0.15, (R15+R16)/(R15−R16)≤0.3, (R15+R16)/(R15−R16)≤0.5 and (R15+R16)/(R15−R16)≤1.

In one embodiment, the first lens L1, the second lens L2, the third lens L3, the fourth lens L4, the fifth lens L5, the sixth lens L6, the seventh lens L7 and the eighth lens L8 may respectively be a spherical lens or an aspheric lens.

Specifically, each of the aspheric lenses has at least one aspheric surface; that is, an object-side surface and/or an image-side surface of the aspheric lens are/is the aspheric surface(s). And, each of the aspheric surfaces may satisfy the following mathematic equation:

$$Z = \left[\frac{(C \times Y^2)}{1 + \sqrt{1 - (K+1)C^2 Y^2}}\right] + \sum (A_i \times Y^i)$$

Z is the coordinate in the direction of the direction in which light propagates is designated as positive; $A_2$, $A_4$, $A_6$, $A_8$ and $A_{10}$ are aspheric coefficients; K is coefficient of quadratic surface; C is reciprocal of R (C=1/R); R is the curvature radius; Y is the coordinate in a direction perpendicular to the optical axis OA, in which the upward direction away from the optical axis OA is designated as positive. In addition, each of the parameters or the coefficients of the equation of each of the aspheric lenses may be designated respectively to determine the focal length of each of the aspheric lenses.

In one specific embodiment, at least one of the second lens L2, the third lens L3, the fourth lens L4 and the fifth lens L5 may be a spherical lens. In another specific embodiment, at least one of the first lens L1, the sixth lens L6, the seventh lens L7 and the eighth lens L8 may be an aspheric lens.

Furthermore, in one embodiment, the first lens L1, the second lens L2, the third lens L3, the fourth lens L4, the fifth lens L5, the sixth lens L6, the seventh lens L7 and the eighth lens L8 may respectively be a glass lens made of a glass material or a plastic lens made of a plastic material. In one specific embodiment, all of the first lens L1, the second lens L2, the third lens L3, the fourth lens L4, the fifth lens L5, the sixth lens L6, the seventh lens L7 and the eighth lens L8 are glass lenses, but the present invention is not limited thereto. In another specific embodiment, at least one of the first lens L1, the second lens L2, the third lens L3, the fourth lens L4, the fifth lens L5, the sixth lens L6, the seventh lens L7 and the eighth lens L8 is a plastic lens.

Further, the material of the plastic lens may include, but not limit to, polycarbonate, cyclic olefin copolymer (e.g. APEL), polyester resins (e.g. OKP4 or OKP4HT) and so on, or a mixture and/or a compound material including at least one of the above-mentioned three materials.

Referring to FIG. 1 and FIG. 2, the object-side surface S1 of the first lens L1 may be a convex surface protruding toward the object side, having positive refractive rate; the image-side surface S2 of the first lens L1 may be a concave surface recessed toward the object side, having positive refractive rate. In one specific embodiment, the first lens L1 may be a lens having positive refractive power, the lens including but not limited to any one of a convex-concave lens, a glass lens or a plastic lens, and a spherical lens or an aspheric lens having positive refractive power, or a combination thereof.

The object-side surface S3 of the second lens L2 may be a convex surface that may be almost close to a flat surface but slightly protrude toward the object side at the optical axis OA, having positive refractive rate; the image-side surface S4 of the second lens L2 may be a concave surface recessed toward the object side, having positive refractive rate. In one specific embodiment, the second lens L2 may be a lens having negative refractive power, the lens including but not limited to any one of a convex-concave lens, a glass lens or a plastic lens, and a spherical lens or an aspheric lens having negative refractive power, or a combination thereof.

The object-side surface S5 of the third lens L3 may be a convex surface protruding toward the object side, having positive refractive rate; the image-side surface S6 of the third lens L3 may be a convex surface protruding toward the image-forming side, having negative refractive rate. In one specific embodiment, the third lens L3 may be a lens having positive refractive power, the lens including but not limited to any one of a biconvex lens, a glass lens or a plastic lens, and a spherical lens or an aspheric lens having positive refractive power, or a combination thereof.

The object-side surface S7 of the fourth lens L4 may be a convex surface protruding toward the object side, having positive refractive rate; the image-side surface S8 of the fourth lens L4 may be a convex surface protruding toward the image-forming side, having negative refractive rate. In one specific embodiment, the fourth lens L4 may be a lens having positive refractive power, the lens including but not limited to any one of a biconvex lens, a glass lens or a plastic lens, and a spherical lens or an aspheric lens having positive refractive power, or a combination thereof.

The object-side surface S9 of the fifth lens L5 may be a concave surface recessed toward the image-forming side, having negative refractive rate; the image-side surface S10 of the fifth lens L5 may be a concave surface recessed toward the object side, having positive refractive rate. In one specific embodiment, the fifth lens L5 may be a lens having negative refractive power, the lens including but not limited to any one of a biconcave lens, a glass lens or a plastic lens, and a spherical lens or an aspheric lens having negative refractive power, or a combination thereof.

The object-side surface S11 of the sixth lens L6 may be a concave surface recessed toward the image-forming side, having negative refractive rate; the image-side surface S12 of the sixth lens L6 may be a convex surface protruding toward the image-forming side, having negative refractive rate. In one specific embodiment, the sixth lens L6 may be a lens having negative refractive power, the lens including but not limited to any one of a concave-convex lens, a glass lens or a plastic lens, and a spherical lens or an aspheric lens having negative refractive power, or a combination thereof.

The object-side surface S13 of the seventh lens L7 may be a concave surface recessed toward the image-forming side, having negative refractive rate; the image-side surface S14 of the seventh lens L7 may be a convex surface protruding toward the image-forming side, having negative refractive rate. In one specific embodiment, the seventh lens L7 may be a lens having negative refractive power, the lens including but not limited to any one of a concave-convex lens, a glass lens or a plastic lens, and a spherical lens or an aspheric lens having negative refractive power, or a combination thereof.

The object-side surface S15 of the eighth lens L8 may be a convex surface protruding toward the object side, having positive refractive rate; the image-side surface S16 of the eighth lens L8 may be a convex surface protruding toward the image-forming side, having negative refractive rate. In one specific embodiment, the eighth lens L8 may be a lens having positive refractive power, the lens including but not limited to any one of a biconvex lens, a glass lens or a plastic lens, and a spherical lens or an aspheric lens having positive refractive power, or a combination thereof.

In one embodiment, the optical lens OL1 may further include a stop STO. In another embodiment, an image capturing unit (not shown) may be further disposed on the imaging plane IMA for photo-electrically converting light beams passing through the optical lens OL1. The stop STO may be arranged in any interval between any two of the first lens L1 to the eighth lens L8, or arranged between the eighth lens L8 and the imaging plane IMA. In one specific embodiment, the stop STO is arranged between the first lens L1 and the second lens L2.

Furthermore, the optical lens OL1 may further include a filter F and/or a protection film C. In one embodiment, the filter F may be arranged between the eighth lens L8 and the imaging plane IMA. In one specific embodiment, the filter F may be an IR filter. In another embodiment, the protection film C may be arranged between the filter F and the imaging plane IMA, and a filter film (not shown) may be further formed on the protection film C. In still another embodiment, the functions of protecting the image capturing unit and filtering the infrared light may both be integrated into the protection film C.

Figure 3:
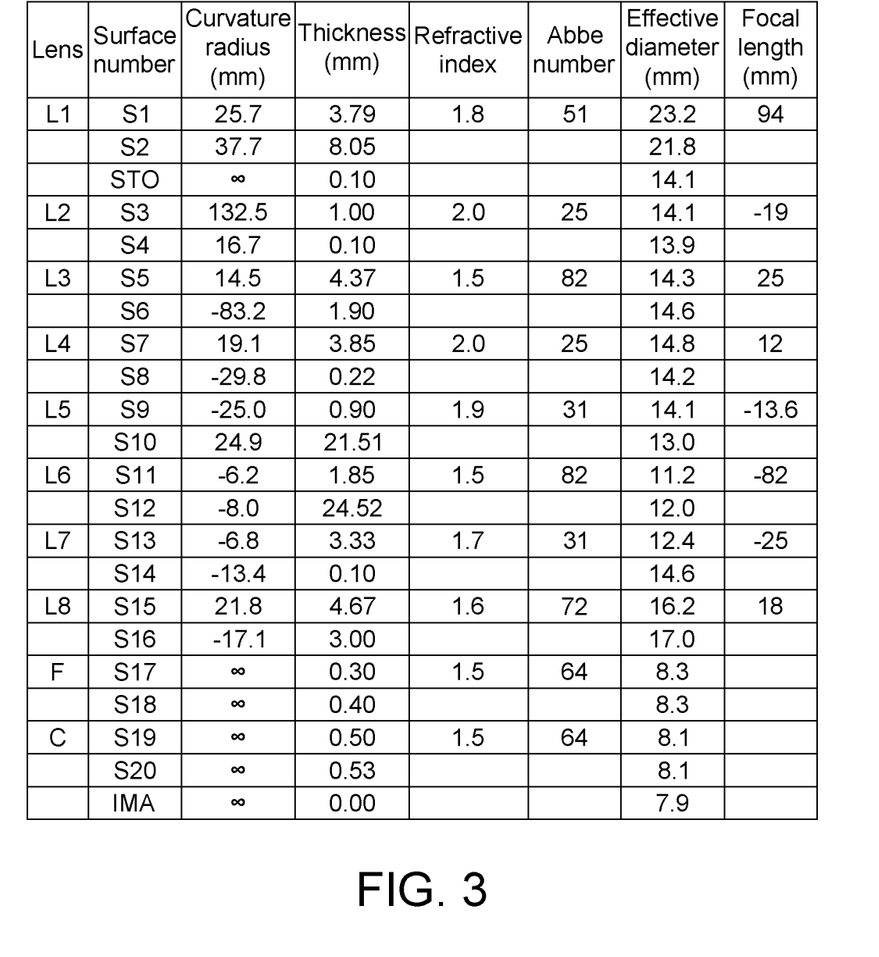
FIG. 3 lists each lens parameter of the optical lens at the telescopic end shown in FIG. 1 according to one embodiment of the present invention.
Figure 4:
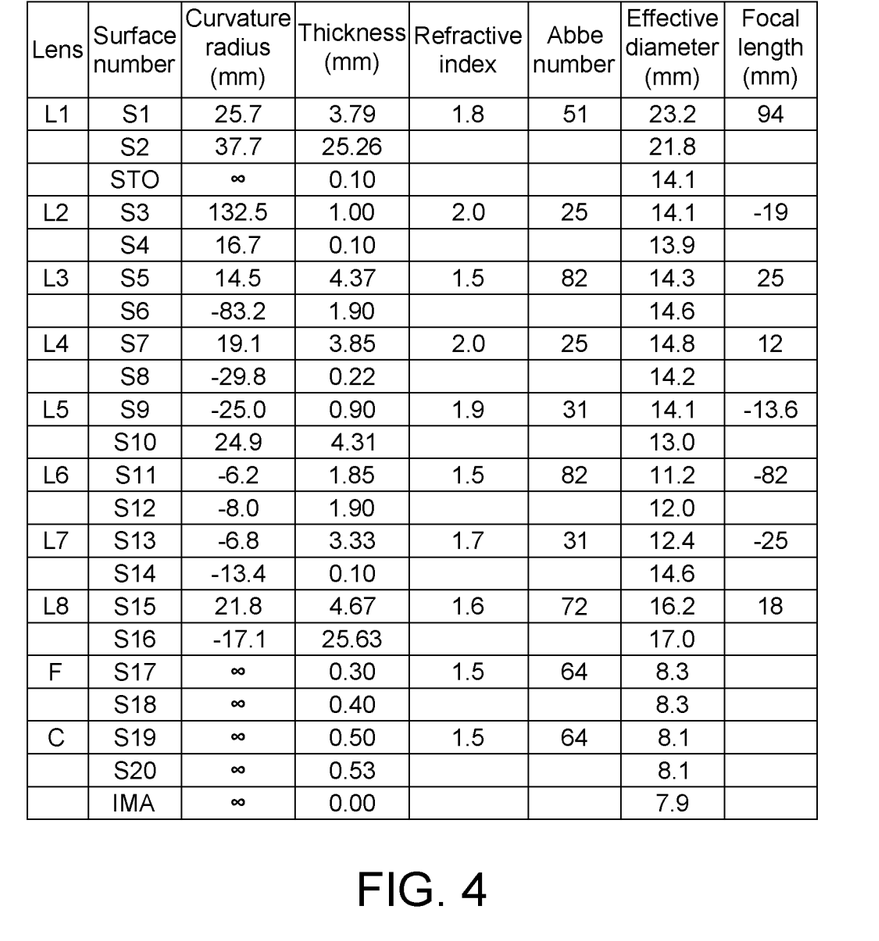
FIG. 4 lists each lens parameter of the optical lens at the wide-angle end shown in FIG. 2 according to one embodiment of the present invention.

FIG. 3 lists each lens parameter of the optical lens OL1 at the telescopic end shown in FIG. 1 according to one embodiment of the present invention. FIG. 4 lists each lens parameter of the optical lens OL1 at the wide-angle end shown in FIG. 2 according to one embodiment of the present invention. FIG. 3 and FIG. 4 respectively lists the parameters including the curvature radius, the thickness, the refractive index, the Abbe number (coefficient of chromatic dispersion), the effective diameter, the focal length and so on of each lens. The surface numbers of the lenses are sequentially ordered from the object side to the image-forming side. For example, "STO" stands for the stop STO, "S1" stands for the object-side surface S1 of the first lens L1, "S2" stands for the image-side surface S2 of the first lens L1, . . . , "S17" and "S18" respectively stand for the object-side surface S17 and the image-side surface S18 of the filter F, "S19" and "S20" respectively stand for the object-side surface S19 and the image-side surface S20 of the protection film C, and so on. In addition, the "thickness" stands for the distance between an indicated surface and an adjacent surface close to the image-forming side. For example, the "thickness" of the object-side surface S1 is the distance between the object-side surface S1 of the first lens L1 and the image-side surface S2 of the first lens L1; the "thickness" of the image-side surface S2 is the distance between the image-side surface S2 of the first lens L1 and the object-side surface S3 of the second lens L2.

Referring to FIG. 1 to FIG. 4, the first lens L1 and the sixth lens L6 stay in the same position when the optical lens OL1 is at the wide-angle end and the telescopic end; however, during the zooming process of the optical lens OL1, each of the first lens group L1 and the sixth lens L6 may move on the optical axis OA or be stationary.

Figure 5:
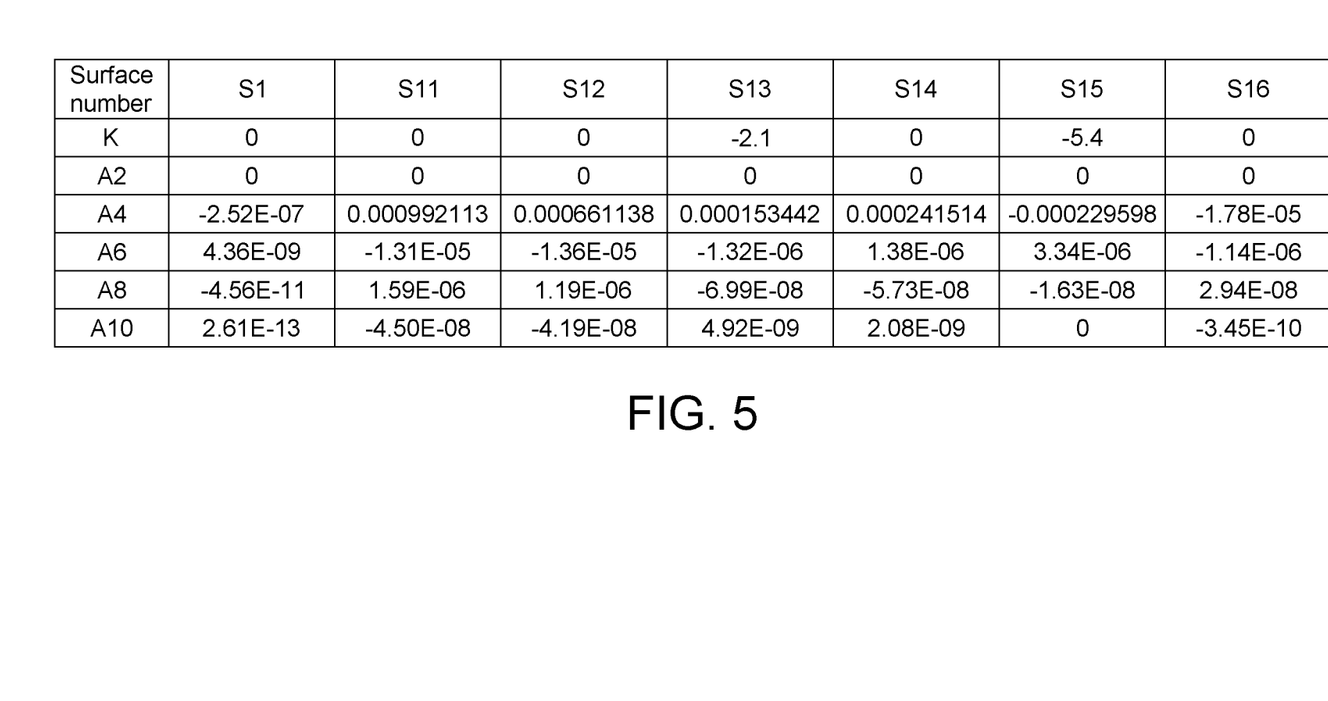
FIG. 5 lists aspheric coefficients of the mathematic equation of the aspheric lenses of the optical lens of FIG. 1 according to one embodiment of the present invention.

FIG. 5 lists aspheric coefficients of the mathematic equation of the aspheric lenses of the optical lens OL1 of FIG. 1 according to one embodiment of the present invention. If the object-side surface S1 of the first lens L1, the object-side surfaces S11, S13, S15 and the image-side surfaces S12, S14, S16 of the sixth lens L6, the seventh lens L7 and the eighth lens L8 of the optical lens OL1 are aspheric surfaces, each of the aspheric coefficients for the mathematic equation of the aspheric lenses may be listed as indicated in FIG. 5.

Further, referring to FIG. 1 and FIG. 2, in one embodiment, the optical lens OL1 may be defined as a first lens group G1, a second lens group G2, a third lens group G3 and a fourth lens group G4. The first lens group G1 may include the first lens L1; the second lens group G2 may include the second lens L2, the third lens L3, the fourth lens L4 and the fifth lens L5; the third lens group G3 may include the sixth lens L6; the fourth lens group G4 may include the seventh lens L7 and the eighth lens L8. In one specific embodiment, the first lens group G1 may have positive refractive power, the second lens group G2 may have positive refractive power, the third lens group G3 may have negative refractive power, and the fourth lens group G4 may have positive refractive power. In another specific embodiment, the first lens group G1, the second lens group G2, the third lens group G3 and the fourth lens group G4 of the optical lens OL1 may shift along the optical axis OA between the telescopic end and wide-angle end during the zooming process. In another specific embodiment, the stop STO may move along the optical axis OA with the movement of the second lens group G2, but the present invention is not limited thereto. In still another specific embodiment, the stop STO may move along the optical axis OA with the movement of the second lens group G2 during the zooming process, but the present invention is not limited thereto.

Figure 6:
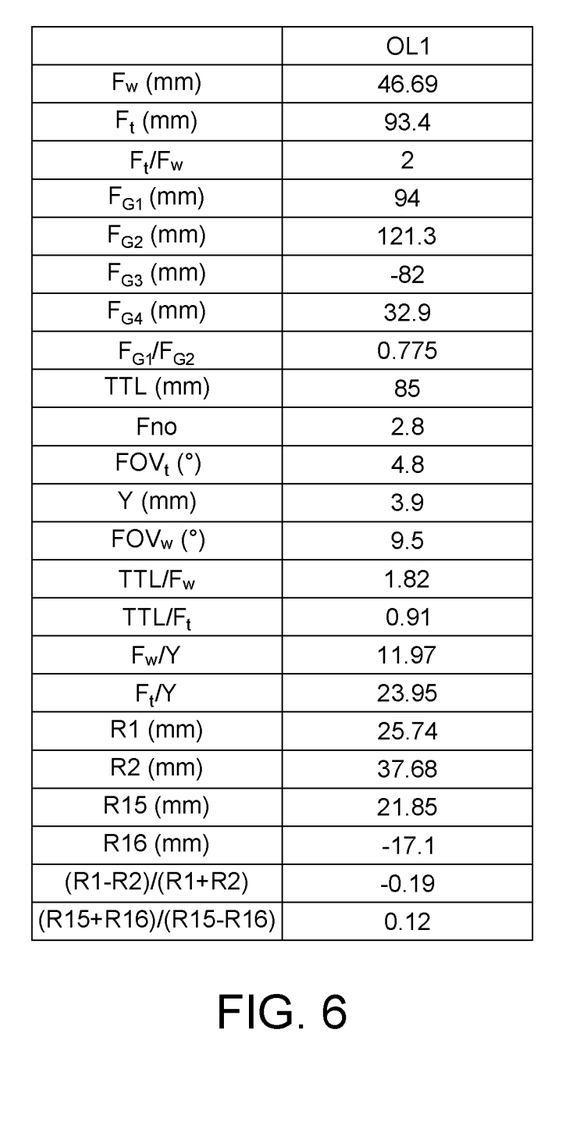
FIG. 6 lists the specific parameters of the optical lens of FIG. 1.

FIG. 6 lists the specific parameters of the optical lens of FIG. 1, including the focal length of the optical lens OL1 at the wide-angle end (Fw), the focal length of the optical lens OL1 at the telescopic end (Ft), the focal length of the first lens group G1 ($F_{G1}$), the focal length of the second lens group G2 ($F_{G2}$), the focal length of the third lens group G3 ($F_{G3}$), the focal length of the fourth lens group G4 ($F_{G4}$), the distance between the object-side surface S1 of the first lens L1 and the imaging plane IMA (TTL), the f-number (Fno), the field of view of the optical lens OL1 at the telescopic end (FOVt), the field of view of the optical lens OL1 at the wide-angle end (FOVw), the image height (Y), the curvature radii of the object-side surfaces S1, S15 and the image-side surfaces S2, S16 at the optical axis OA (R1, R15, R2 and R16), and the values of the relations for the above parameters.

Moreover, in one embodiment, the optical lens OL1 may satisfy at least one of the following conditions: $0.5 \leq F_{G1}/F_{G2}$, $0.7 \leq F_{G1}/F_{G2}$, $0.75 \leq F_{G1}/F_{G2}$, $F_{G1}/F_{G2} \leq 0.8$, $F_{G1}/F_{G2} \leq 0.85$ and $F_{G1}/F_{G2} \leq 1$.

Figure 7:
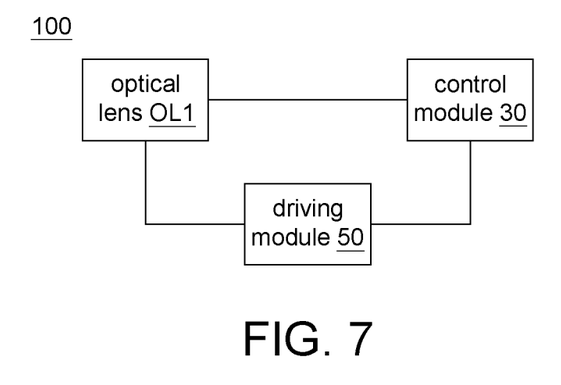
FIG. 7 shows a schematic diagram of an electronic apparatus according to one embodiment of the present invention.

FIG. 7 shows a schematic diagram of an electronic apparatus 100 according to one embodiment of the present invention. Referring to FIG. 1, FIG. 2 and FIG. 7, the electronic apparatus 100 includes the optical lens OL1, a control module 30 and a driving module 50. The control module 30 is electrically connected to the optical lens OL1, and the driving module 50 is electrically connected to the control module 30 and the optical lens OL1.

The optical lens OL1 may continuously capture a plurality of images and transmit the images to the control module 30. At least two of the images contain a target, which may be a person, a human face, an animal, an object pre-designated by the user or a subject automatically selected by control module 30, but the present invention is not limited thereto. The control module 30 calculates a focus information of the optical lens in accordance with the target in the images. The focus information may include the respective positions of the first lens L1, the second lens L2, the third lens L3, the fourth lens L4, the fifth lens L5, the sixth lens L6, the seventh lens L7 and the eighth lens L8 on the optical axis OA. Afterwards, the driving module 50 drives the optical lens OL1 to focus in accordance with the focus information, so that the first lens L1, the second lens L2, the third lens L3, the fourth lens L4, the fifth lens L5, the sixth lens L6, the seventh lens L7 and the eighth lens L8 move to their focus positions according to the focus information. In one specific embodiment, the optical lens OL1 continues to capture images, the control module 30 continues to update the focus information in accordance with the latest images, and the driving module 50 continues to drive the optical lens OL1 to the focus position with the updated focus information.

As can be seen from the above embodiments, the optical lens provided in the present invention may have the characteristics of thinness, high zoom magnification, low distortion and high imaging quality.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An optical lens being a zoom lens which zooms between a telescopic end and a wide-angle end, the optical lens, in order from an object side to an image-forming side comprising:
   a first lens having positive refractive power and an Abbe number of V1;
   a second lens having negative refractive power;
   a third lens having positive refractive power;
   a fourth lens having positive refractive power;
   a fifth lens having negative refractive power;
   a sixth lens having negative refractive power;
   a seventh lens having negative refractive power; and
   an eighth lens, which is a lens closest to the image-forming side, having refractive power and an Abbe number of V8, and V8>V1, wherein Y is an image height of the optical lens, Ft is a focal length at the telescopic end, Fw is a focal length at the wide-angle end, TTL is a distance between an object-side surface of the first lens and an imaging plane, and the optical lens satisfies at least one of the following conditions: 8<Fw/Y<20, 0.85≤TTL/Ft≤1.80 mm≤Ft≤110 mm, 35 mm≤Fw≤60 mm and 1.7≤Ft/Fw≤2.3,
   wherein the optical lens comprises no fewer than and no more than eight lenses.

2. The optical lens according to claim 1, wherein the first lens has a refractive index of N1, the second lens has a refractive index of N2 and an Abbe number of V2, the third lens has a refractive index of N3 and an Abbe number of V3, the fourth lens has a refractive index of N4 and an Abbe number of V4, the fifth lens has a refractive index of N5 and an Abbe number of V5, the sixth lens has a refractive index of N6 and an Abbe number of V6, the seventh lens has a refractive index of N7 and an Abbe number of V7, the eighth lens has a refractive index of N8, and the optical lens satisfies at least one of the following conditions: N2>N5, N4>N5, N5>N1, N1>N7, N7>N8, N8>N3, N8>N6, V3>V8, V6>V8, V1>V5, V1>V7, V7>V2 and V7>V4.

3. The optical lens according to claim 1, wherein R1 is a curvature radius of an object-side surface of the first lens, R2 is a curvature radius of an image-side surface of the first lens, R15 is a curvature radius of an object-side surface of the eighth lens, R16 is a curvature radius of an image-side surface of the eighth lens, and the optical lens satisfies at least one of the following conditions: 0≤|(R1−R2)/(R1+R2)|≤1, −1≤(R1−R2)/(R1+R2)≤0, 0≤|(R15+R16)/(R15−R16)|≤1 and 0≤(R15+R16)/(R15−R16)≤1.

4. The optical lens according to claim 1, wherein the optical lens satisfies at least one of the following conditions:
   the eighth lens has positive refractive power;
   an overall optical effect of the second lens, the third lens, the fourth lens and the fifth lens is positive refractive power; and
   an overall optical effect of the seventh lens and the eighth lens is positive refractive power.

5. The optical lens according to claim 1, wherein the first lens is defined as a first lens group, the second lens, the third lens, the fourth lens and the fifth lens are defined as a second lens group, $F_{G1}$ is a focal length of the first lens group, $F_{G2}$ is a focal length of the second lens group, and the optical lens satisfies $0.5 \leq F_{G1}/F_{G2} \leq 1$.

6. The optical lens according to claim 1, wherein the optical lens satisfies at least one of the following conditions: the first lens is a convex-concave lens, the second lens is a convex-concave lens, the third lens is a biconvex lens, the fourth lens is a biconvex lens, the fifth lens is a biconcave lens, the sixth lens is a concave-convex lens, the seventh lens is a concave-convex lens, and the eighth lens is a biconvex lens.

7. An electronic apparatus comprising:
   the optical lens according to claim 1 for continuously capturing a plurality of images, TLt being a lens length of the optical lens at the telescopic end, TLw being a lens length of the optical lens at the wide-angle end, and the optical lens satisfies at least one of the following conditions: 70 mm≤TTL≤100 mm, TLt=TLw, and TLt=TLw=TTL;
   a control module electrically connecting to the optical lens, the control module calculating a focus information of the optical lens in accordance with a target in the images; and
   a driving module electrically connecting to the control module and the optical lens, the driving module driving the optical lens to focus in accordance with the focus information.

8. The optical lens according to claim 1, wherein the optical lens satisfies at least one of the following conditions: 20<Ft/Y<30 and 1.3≤TTL/Fw≤2.5.

* * * * *